United States Patent [19]

Reynolds

[11] Patent Number: 5,375,625
[45] Date of Patent: Dec. 27, 1994

[54] VALVE BODY ASSEMBLY WITH DETENT AND LOCKING MECHANISM

[75] Inventor: Steven M. Reynolds, Mansfield, Ohio
[73] Assignee: Warren Rupp, Inc., Mansfield, Ohio
[21] Appl. No.: 22,446
[22] Filed: Feb. 25, 1993
[51] Int. Cl.$^5$ .................. F15B 13/042; F16K 35/04; F16K 35/06; F16K 35/10
[52] U.S. Cl. .................. 137/625.69; 91/322; 91/337; 137/625.66; 251/89; 251/297
[58] Field of Search .................. 91/289, 322, 337; 137/625.66, 625.69; 251/89, 297

[56] References Cited

U.S. PATENT DOCUMENTS

| | | | |
|---|---|---|---|
| 1,975,178 | 10/1934 | Smith et al. | 251/104 |
| 2,441,094 | 5/1948 | Alderfer | 251/110 |
| 2,605,079 | 7/1952 | Miller et al. | 137/625.66 X |
| 2,847,181 | 8/1958 | Muller | 251/101 X |
| 3,044,492 | 7/1962 | Peters et al. | 92/23 X |
| 3,304,126 | 2/1967 | Rupp et al. | 302/21 |
| 3,580,287 | 5/1971 | McLaughlin | 137/625.69 |
| 3,608,586 | 9/1971 | Daggy | 251/297 X |
| 3,623,695 | 11/1971 | Hislop | 137/625.66 X |
| 3,735,781 | 5/1973 | Kesti | 251/297 X |
| 3,799,203 | 3/1974 | Doutt | 251/297 X |
| 4,165,860 | 8/1979 | Gillespie | 251/297 |
| 4,185,661 | 1/1980 | Gill et al. | 251/297 X |
| 4,472,115 | 9/1984 | Rupp | 417/393 |
| 4,995,421 | 2/1991 | Bonacorsi et al. | 137/625.69 X |

FOREIGN PATENT DOCUMENTS

| | | | |
|---|---|---|---|
| 2533537 | 2/1977 | Germany | 251/297 |
| 1575812 | 10/1980 | United Kingdom | 251/297 |
| 1593260 | 7/1981 | United Kingdom | 137/625.69 |

*Primary Examiner*—Gerald A. Michalsky
*Attorney, Agent, or Firm*—Hill, Steadman & Simpson

[57] ABSTRACT

A valve assembly including a valve housing with a spool valve mounted for reciprocation within the valve housing, with a detent mechanism disposed on the spool valve and the valve housing for selectively locking the spool valve against reciprocal movement, and for providing an externally observable indicator of valve position. In an illustrative embodiment, the detent assembly of the present invention includes at least one detent pin disposed on the spool valve, with at least one guide flange disposed on the valve housing. The guide flange is adapted to at least partially surround the detent pin. At least one retaining clip is provided which is adapted for insertion through the guide flange to engage the detent pin. When the retaining clip is inserted through the guide flange and in engagement with the detent pin, the spool valve is locked into a predetermined stationary position, and cannot reciprocate. The detent assembly can also include at least one detent pad disposed in the valve housing which is capable of operative engagement with the detent pin in order to provide a physical indication of the position of the spool valve. The detent pad can be provided in the form of an elastomeric washer disposed at one end of the valve housing. The elastomeric washer is provided with a central aperture having a diameter that is substantially less than the outer diameter of the detent pin of the spool valve. The detent pin can be provided with a recessed groove which interacts with the detent pad to provide a tactile indication that the spool valve has reached a predetermined position.

16 Claims, 1 Drawing Sheet

VALVE BODY ASSEMBLY WITH DETENT AND LOCKING MECHANISM

TECHNICAL FIELD

The present invention relates to reciprocating control valve assemblies, and specifically to spool valve assemblies used as reversing valves for reciprocating pumps, such as diaphragm pumps.

BACKGROUND OF THE INVENTION

It is known to use reciprocating valves, specifically spool valves, as reversing valves for controlling the operating of reciprocating pumps. Such valves are disclosed in conjunction with diaphragm pumps in, for example, U.S. Pat. No. 3, 304,126 and U.S. Pat. No. 4,472,115. In apparatus such as those disclosed in these patents, a spool valve, often under the influence of a pilot valve, is shifted back and forth to reverse the flow of motive fluid from one side of a diaphragm to the other, thus causing the diagram to reciprocate. Such valves are generally provided in enclosed chambers, thus making it impossible to determine the position of the spool valve by observation of the outside of the spool valve housing. Furthermore, conventional spool valves provide no means by which the spool valve can be secured in one position during servicing or maintenance of the pump or pump control system.

It can thus be seen that the need exists for a valve assembly wherein the position of the valve can be easily detected, and wherein the valve can be secured in a stationary position during maintenance or servicing of the pump.

SUMMARY OF THE INVENTION

The present invention provides a valve assembly that overcomes the abovenoted shortcomings of the prior art by providing a valve assembly including a valve housing with a spool valve mounted for reciprocation within the valve housing, with a detent and locking mechanism disposed on the spool valve and the valve housing for selectively locking the spool valve against reciprocal movement, and for providing an externally observable indicator of valve position and for providing a detent arrangement to prevent inadvertent valve reciprocation during pump operation. In an illustrative embodiment, the detent assembly of the present invention includes at least one detent pin disposed on the spool valve, with at least one guide flange disposed on the valve housing. The guide flange is adapted to at least partially surround the detent pin. At least one retaining clip is provided which is adapted for insertion through the guide flange to engage the detent pin. When the retaining clip is inserted through the guide flange and in engagement with the detent pin, the spool valve is locked into a predetermined stationary position, and cannot reciprocate. The detent assembly can include at least one detent pad disposed in the valve housing which is capable of operative engagement with the detent pin in order to provide a physical indication of the position of the spool valve and to prevent unwanted spool movement during pump operation. The detent pad can be provided in the form of an elastomeric washer disposed at one end of the valve housing. The elastomeric washer is provided with a central aperture having a diameter that is substantially less than the outer diameter of the detent pin of the spool valve. The detent pin can be provided with a recessed groove which engages the detent pad.

In an illustrative embodiment, the valve assembly can include an internal bore adapted to receive the valve spool, with a pair of end caps secured at opposite ends of the valve body. The end caps are provided with apertures that are adapted to surround the detent pins of the spool valve. The guide flanges can be mounted on the respective end caps. The valve assembly can also include end cap bushings mounted within the end caps to provide a seal between the valve housing and the detent pins. The guide flanges can be provided as substantially U-shaped flanges extending longitudinally from the end caps, with a transverse bore in the U-shaped flange that is adapted to receive the retaining clip. The spool valve may include a valve sleeve in which a valve spool is mounted for reciprocation. A pair of spool bumpers can be mounted at opposite ends of the valve sleeve to cushion the valve spool during reciprocation.

Other objects and advantages of the present invention will be apparent upon reference to the accompanying description when taken in conjunction with the following drawings.

BRIEF DESCRIPTION OF THE DRAWINGS

FIG. I illustrates a sectional view of a valve assembly constructed in accordance with the principles of the present invention.

DETAILED DESCRIPTION OF THE PREFERRED EMBODIMENT

Figure 1:
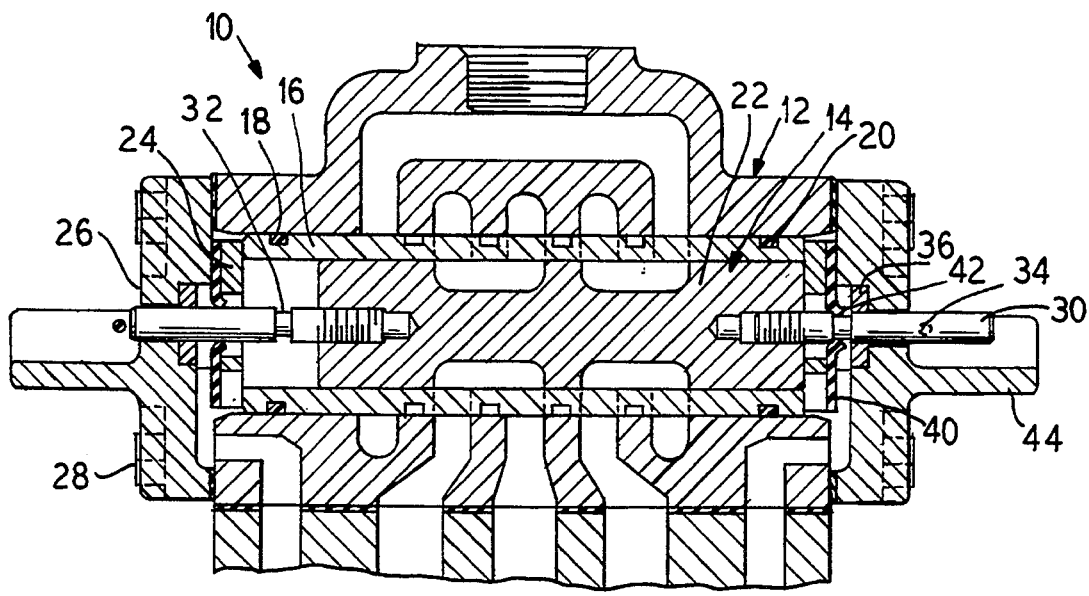

A valve assembly 10 embodying the principles of the present invention is illustrated in FIG. 1. The valve assembly 10 includes a valve housing 12 in which a spool valve 14 is mounted for reciprocation. The valve assembly 10 may be used as part of a pneumatic or hydraulic control system for a diaphragm pump, as described in the Background of the Invention. The spool valve 14, as illustrated, includes a valve sleeve 16 mounted within the valve housing 12. A pair of O-rings 18 provide a fluid seal between the valve sleeve 16 and an internal bore 20 of the valve housing 12. A valve spool 22 is mounted for reciprocation within the valve sleeve 16. A pair of spool bumpers 24 are provided at opposite ends of the valve housing 12, and act to cushion the valve spool 22 at the limits of its reciprocation. The valve housing 12 is closed at each end by a respective end cap 26. The end caps 26 are secured to the valve housing 12 by an appropriate fastening mechanism 28 such as hex-head capscrews.

The valve spool 22 is provided with a pair of detent pins 30. The detent pins 30 extend from opposite ends of the valve spool 22 along a longitudinal axis thereof. Each of the detent pins 30 is provided with a recessed groove 32 that extends circumferentially around the detent pin, and is also provided with a transverse bore 34 extending diametrically through the detent pins 30. The functions of the recessed grooves 32 and transverse bores 34 will be described in detail hereinbelow. The detent pins 30 are of sufficient length to extend through the respective end caps 26. A pair of end cap bushings 36 are provided within the end caps 26 to provide a fluid tight seal between the detent pins 30 and the end caps 26.

As can be seen in FIG. 1, the present invention may include a pair of detent pads 40 located at opposite ends of the valve housing 12. The detent pads 40 may be provided by elastomeric washers having central apertures 42. The central apertures 42 have a diameter substantially less than the diameter of the detent pins 30, and are positioned such that the detent pad 40 is capable of operative engagement with the recessed groove 32 of the detent pin 30, as shown in the right-hand side of FIG. 1. Engagement of the detent pad 40 with the recessed groove 32 of the detent pin 30 provides a resistance to unwanted or inadvertent movement of the valve spool 22, while also providing tactile indication of spool valve position when the valve spool 22 is manually moved to effect such engagement. The degree of resistance can be modified as desired by modifying the size of the aperture 42 or by changing the holding strength of the pads 40.

Figure 2:
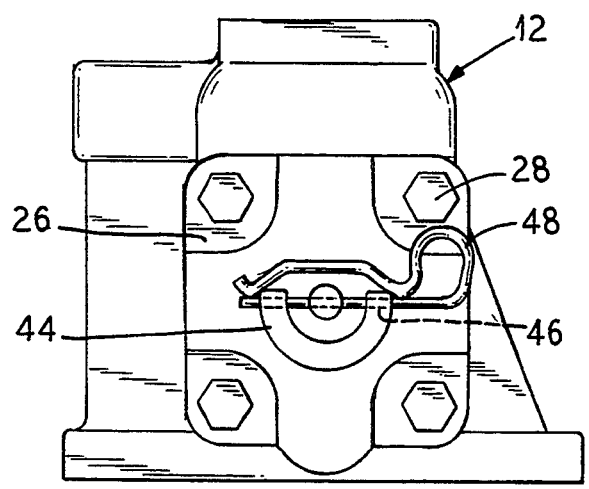
FIG. 2 illustrates an elevational end view of the valve assembly of FIG. 1.

The valve assembly 10 is also provided with a pair of guide flanges 44. Each of the guide flanges 44 extends generally longitudinally from the respective end caps 26. The guide flanges 44 may be provided as a pair of U-shaped flanges extending longitudinally from the end caps such that the guide flanges 44 at least partially surround the detent pins 30 when they are in a position extending out of the end caps 26. As shown in FIG. 2, the guide flanges 44 are provided with transverse bores 46 that are capable of alignment with the transverse bores 34 of the detent pins 30. The transverse bore 34 of the detent pin 30 and the transverse bores 46 of the guide flanges 44 are adapted to receive a retaining clip 48. When the retaining clip 48 is inserted through the transverse bores 46 of the guide flanges 44 and the transverse bore 34 of the detent pin 30, the spool valve is locked against reciprocation. With the spool valve locked against reciprocation, service, maintenance, or other procedures may be performed on the diaphragm pump associated with the valve assembly 10 with the knowledge that the reversing valve will remain stationary, thus preventing accidental displacement of the pump.

It is, of course, to be understood that the foregoing description is for illustrative purposes only, and that the principles of applicants inventions are amendable to other specific embodiments. For example, it is contemplated that the valve assembly could be provided with only one detent pin rather than the pair of detent pins as shown in the illustrated embodiment.

Although the present invention has been described with reference to a specific embodiment, those of skill in the art will recognize that changes may be made thereto without departing from the scope and spirit of the invention as set forth in the appended claims.

I claim as my invention:

1. A valve assembly comprising the following:
   a valve housing;
   a spool valve mounted for reciprocation with said valve housing; and
   detent means disposed on said spool valve and said valve housing for selectively locking said spool valve against reciprocal movement wherein said detent means comprises the following:
   at least one detent pin having a substantially uniform diameter and further having a recessed circumferential groove intermediate ends of each of the at least one detent pins disposed on said spool valve;
   at least one detent pad disposed in said valve housing, said at least one detent pad having means for frictionally engaging with said at least one detent pin at the circumferential groove of the at least one detent pin;
   at least one guide flange disposed on said valve housing, said at least one guide flange being adapted to at least partially surround said at least one detent pin; and
   at least one retaining clip adapted for insertion through a bore extending through said at least one guide flange to engage said at least one detent pin;
   whereby engagement of said at least one retaining clip with said detent pin locks said spool valve against reciprocation.

2. A valve assembly according to claim 1, wherein said at least one guide flange comprises a pair of guide flanges mounted at opposite ends of said valve housing.

3. A valve assembly according to claim 1, wherein said spool valve comprises the following:
   a valve sleeve mounted in said valve housing;
   a pair of spool bumpers mounted at opposite ends of said valve sleeve; and
   a spool valve member mounted for reciprocation within said valve sleeve.

4. A valve assembly comprising the following:
   a valve housing;
   a spool valve mounted for reciprocation with said valve housing; and
   detent means disposed on said spool valve and said valve housing for selectively locking said spool valve against reciprocal movement, wherein said detent means comprises the following:
   at least one detent pin disposed on said spool valve;
   at least one guide flange disposed on said valve housing, said at least one guide flange being adapted to at least partially surround said at least one detent pin; and
   at least one retaining clip adapted for insertion through said at least one guide flange to engage said at least one detent pin;
   whereby engagement of said at least one retaining clip with said detent pin locks said spool valve against reciprocation, wherein said valve housing comprises the following:
   a valve body having an internal bore adapted to receive said valve spool; and
   a pair of end caps secured at opposite ends of said valve body, at least one of said end caps having an aperture therein adapted to surround said at least one detent pin;
   wherein said at least one guide flange is mounted on said at least one of said end caps.

5. A valve assembly according to claim 4, further comprising at least one end cap bushing mounted in said at least one of said end caps, said at least one end cap bushing being mounted in surrounding engagement with said at least one detent pin.

6. A valve assembly according to claim 4, wherein said at least one guide flange comprises a substantially U-shaped flange extending longitudinally from said at least one of said end caps, said at least one guide flange including a transverse bore adapted to receive said retaining clip.

7. A valve assembly comprising the following:
   a valve housing;
   a spool valve mounted for reciprocation within said valve housing;
   at least one detent pin disposed on said spool valve having a uniform diameter;

at least one detent pad disposed in said valve housing, said at least one detent pad having means for frictionally engaging with said at least one detent pin during all reciprocal movement of said spool valve within said housing to provide a first level of resistance to movement of the spool valve, and for frictionally engaging with said at least one detent pin when said at least one detent pin is moved to a predetermined position relative to said at least one detent pad to provide a higher level of resistance to movement of said spool valve; and detent means disposed on said spool valve and said valve housing for selectively locking said spool valve against reciprocal movement.

8. A valve assembly according to claim 7, wherein said detent means comprises the following:

at least one guide flange disposed on said valve housing, said at least one guide flange being adapted to at least partially surround said at least one detent pin; and at least one retaining clip adapted for insertion through said at least one guide flange to engage said at least one detent pin;

whereby engagement of said at least one retaining clip with said detent pin locks said spool valve against reciprocation.

9. A valve assembly according to claim 8, wherein said at least one guide flange comprises a pair of guide flanges mounted at opposite ends of said valve housing.

10. A valve assembly according to claim 8, wherein said spool valve comprises the following:

a valve sleeve mounted in said valve housing;

a pair of spool bumpers mounted at opposite ends of said valve sleeve; and a spool valve member mounted for reciprocation within said valve sleeve.

11. A valve assembly according to claim 7, wherein said at least one detent pin comprises a recesses circumferential groove for engagement with said at least one detent pad.

12. A valve assembly according to claim 11, wherein each of said at last one detent pad comprises an elastomeric washer including a central aperture having a diameter substantially less than a diameter of said detent pin of said spool valve.

13. A valve assembly comprising the following:

a valve housing;

a spool valve mounted for reciprocation within said valve housing;

at least one detent pin disposed on said spool valve;

at least one detent pad disposed in said valve housing, said at least one detent pad being capable of operative engagement with said at least one detent pin; and detent means disposed on said spool valve and said valve housing for selectively locking said spool valve against reciprocal movement, wherein said detent means comprises the following:

at least one guide flanged disposed on said valve housing, said at least one guide flange being adapted to at least at least partially surround said at least one detent pin; and at least one retaining clip adapted for insertion through said at least one guide flange to engage said at least one detent pin;

whereby engagement of said at least one retaining clip with said detent pin locks said spool valve against reciprocation, wherein said valve housing comprises the following:

an internal bore in said valve housing, said internal bore being adapted to receive said valve spool; and a pair of end caps secured at opposite ends of said valve body, at least one of said end caps having an aperture therein adapted to surround said at least one detent pin;

wherein said at least one guide flange is mounted on said at least one of said end caps.

14. A valve assembly according to claim 13, further comprising at least one end cap bushing mounted in said at least one end caps, said at least one end cap bushing being mounted in surrounding engagement with said at least one detent pin.

15. A valve assembly according to claim 13, wherein said at least one guide flange comprises a substantially U-shaped flange extending longitudinally from said at least one of said end caps, said at least one guide flange including a transverse bore adapted to receive said retaining clip.

16. A valve assembly according to claim 13, wherein said at least one detent pad comprises a pair of detent pads secured between said end caps and said valve housing.

* * * * *